April 16, 1963 K. SHMUELI 3,085,433
CRYOGENIC LIQUID LEVEL DETECTOR
Filed April 15, 1960
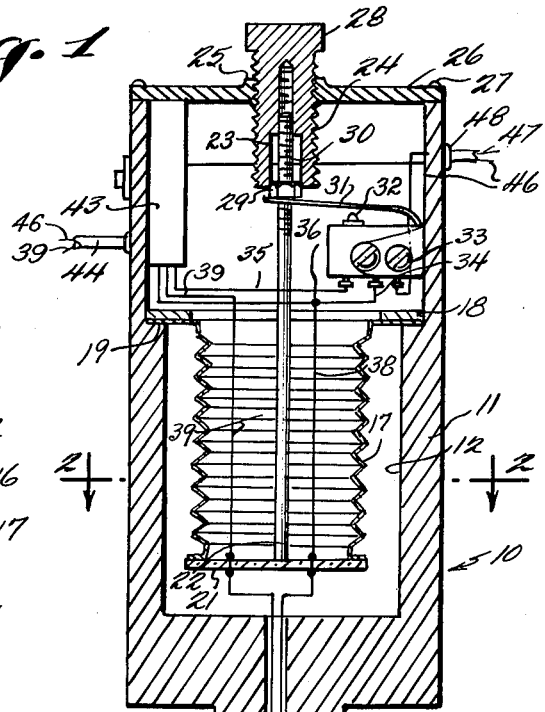
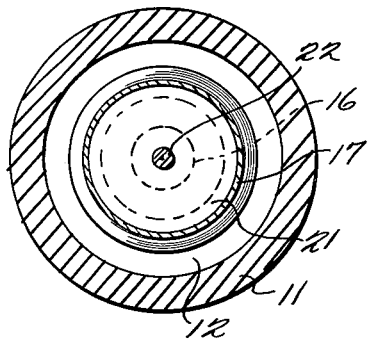
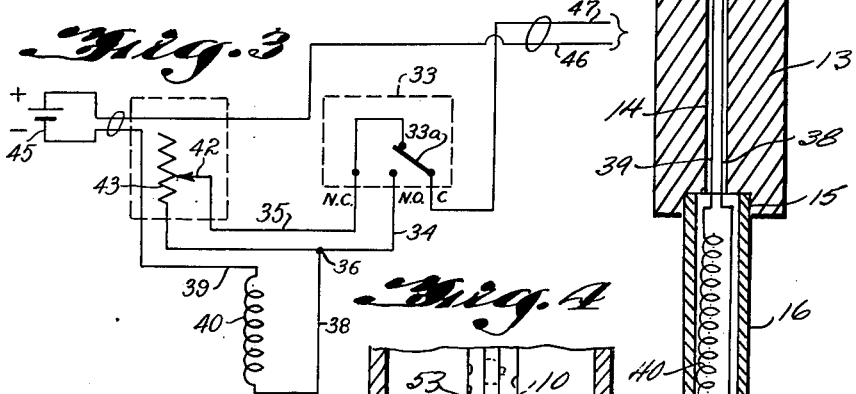
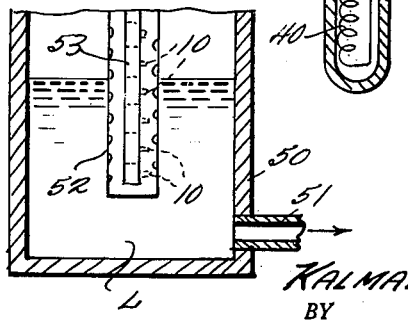
INVENTOR.
KALMAN SHMUELI
BY
Kimmel & Crowell
ATTORNEYS

United States Patent Office

3,085,433
Patented Apr. 16, 1963

3,085,433
CRYOGENIC LIQUID LEVEL DETECTOR
Kalman Shmueli, Washington, D.C., assignor to Cryogenics, Inc., Pompano Beach, Fla., a corporation of Florida
Filed Apr. 15, 1960, Ser. No. 22,619
4 Claims. (Cl. 73—295)

This invention relates to a liquid level detector, and more particularly to a device for determining a change in state of a fluid, as from liquid to gaseous or vice versa, and specifically at cryogenic temperatures.

A primary object of this invention is the provision of a cryogenic liquid level detector of this character for use in controlling or indicating liquid level of cryogenic media in containers storing the same, or in detecting or controlling a change of state of a fluid in a pipeline at particular locations.

An additional object of the invention is the provision of an instrument of this character which may be employed for controlling the filling or emptying of a storage receptacle by automatic means, for automatically controlling or indicating the rate of flow into or out a tank or receptacle, for the measurement or control of the evaporation rate of a liquid, or for calibrating, testing, controlling or otherwise treating other apparatus which is dependent on a change of liquid level in a tank or receptacle.

A further important object of the invention is the provision of such an instrument which may be employed for the determination of a change of state in a pipeline system for the purposes of controlling apparatus or machinery which is dependent on the presence of a liquid in the pipeline, or for the determination and control of the cool down rates of pipelines.

A specific object of the invention is the provision of a device of this character which may be employed in the control of propellant utilization in missiles or the like, which may require the "on demand" control of the system of liquifiers or storage supply and gas consumption process wherein the maintenance of a particular volume of liquid in a tank or receptacle is required at all times.

Still another object of the invention is the provision of a device for calibrating, testing, and/or controlling any devices which are interrelated to volumetric displacement within a tank.

A further important object of the invention is the provision of an apparatus for detecting liquid level in cryogenic mediums by the determination of the liquid or gaseous phase of a fluid which is independent of the pressure head, the dielectric constant, and any electrical properties of the fluid.

A more specific object of the invention is the provision of a device which employs the difference in heat capacity of a surrounding medium to create a pressure change in an enclosed chamber containing a small volume of inert gas, the change in heat capacity being sensed by the volume of gas and being related as an instantaneous pressure change, which is in turn sensed by a sensitive pressure switch located externally of the storage receptacle or flow line.

A further object of the invention is the provision of an instrument which includes a sensing capsule which is located interiorly of the storage receptacle or pipeline from which a change in state is immediately transmitted to a pressure switch which is located externally of the tank or flow line and may, if desired, be hermetically sealed in a receptacle as an explosion proof assembly.

A more specific object of the invention is the provision of a device of this character which is insensitive to droplets and splashing.

A still further specific object of the invention is the provision of a device of this character which can be used in multiple at consecutive stations along the cryogenic line to indicate when liquid has reached different stations, or which can be fabricated in multiple into a liquid level rake with an unlimited number of detecting stations at desired spacings, such rakes being effective particularly in the measuring of propellant utilization, with the measurement and control of liquid level in storage dewars or missile fuel tanks for controlling other system functions and controls dependent on liquid level, and for relating the change of liquid level to another interrelated function on a real time basis.

A more specific object of the invention resides in the provision of such an instrument which includes a receptacle which is filled with an appropriate gas at a known temperature and pressure, the sensing volume of which, when subjected to cryogenic temperatures, will undergo a decrease in pressure. A relatively small heat leak is maintained into this sensing volume until the system achieves a pressure which will actuate a contained switch. This small heat leak will not be dissipated to a significant degree until the sensing volume is in intimate contact with the liquid phase. At the time that the liquid phase is introduced to the sensing volume the switch will be actuated materially to increase the heat leak maintained in the sensing volume. This increased heat leak will be dissipated virtually in its entirety as long as the sensing volume is in intimate contact with the liquid phase, but when the state of the medium changes at the sensing volume (due, for example, to change in liquid level) from liquid to vapor, the heat leak in its increased capacity is capable of heating the sensing volume to a point where the internal pressure in the system becomes sufficient to actuate the switch to reintroduce the lower or smaller heat leak.

A further specific object of the invention is the provision of a device of this character wherein the sensing volume of the gas is augmented by an auxiliary volume in constant interrelation therewith, the auxiliary volume providing an increased system pressure sensitivity at cryogenic temperature levels.

Still another object of the invention is the provision of a cryogenic liquid level detector of this character which is adapted to a detection of liquid level to an accuracy of ±.05 inch in such media as liquid hydrogen, oxygen, nitrogen, fluorine, or the like, which is light in weight, which is readily adaptable to airborne or ground use, and which can be accommodated to a wide variety of output signals compatible with existing interrelated systems.

A further object of the invention is the provision of such a device which is readily adaptable to high pressures up to 10,000 p.s.i., and which has a response time in the order of 100 to 200 milliseconds.

Still other objects reside in the combination of elements, the arrangements of parts, and features of construction, all as will be more fully pointed out hereinafter, and disclosed in the accompanying drawing wherein there is shown an illustrative embodiment of this inventive concept.

In the drawings:

FIGURE 1 is a longitudinal sectional view taken substantially along the center line of one form of instrument embodying the instant inventive concept.

FIGURE 2 is a sectional view taken substantially along the line 2—2 of FIG. 1 as viewed in the direction indicated by the arrows.

FIGURE 3 is a wiring diagram for the instrument, and

FIGURE 4 is a fragmentary diagrammatic view showing the installation of a plurality of the instruments in a liquid level rake installation.

Similar reference characters refer to similar parts throughout the several views of the drawings.

Having reference now to the drawings in detail, one form of instrument embodying elements in the instant inventive concept is generally indicated at 10, and includes a housing or casing 11, having a hollow interior forming a chamber 12, the casing 11 being adapted for positioning outside of a storage receptacle, pipeline, or the like. A stem 13 extends from receptacle 11 and has an interiorly positioned well or bore 14, which extends longitudinally therethrough. The stem 13 may vary in thickness and in length in accordance with the installation with which it is to be employed. The end of the stem 13 is recessed as at 15, and has secured thereto in sealed relation a capsule 16, which has a chamber enclosing the sensing element of the device and is adapted to be positioned interiorly of the receptacle or pipeline in direct contact with the fluid to be sensed. The capsule may be in any desired thickness and length in accordance with the pressure and the use to which it may be subjected, and is constructed of any suitable material, such for example, as copper or stainless steel, when employed with liquid hydrogen, oxygen, or nitrogen, or when subjected to contact with corrosive fluid such as fluorine may be constructed of Monel metal or similar resistant material.

A pressure responsive bellows 17 is positioned interiorly of the chamber 12, and includes a flange 18, which is suitably sealed to a shoulder or flange 19 interior of the chamber 12. The bellows 17 is provided with a relatively rigid bottom 21, to which is fixedly secured an actuating rod 22. The actuating rod extends upwardly into a hexagonal bore 23 in the interior of an adjusting screw 24, which is threaded into a threaded boss 25 carried by the cover 26 of the instrument. The cover 26 is suitably secured in position as by means of screws 27, and the screw 24 is provided with a knurled external operating knob 28. A hexagonal lock nut 29, secured to the threaded end 30 of stem 22, seats in bore 23 and holds in position a switch actuating arm 31. By suitable rotation of screw 28, it will be obvious that the position of the switch arm 31 relative to the base 21 of bellows 17 may be minutely varied in its operating travel in accordance with the desired operating conditions without varying the position of same.

The actuating arm 31 is adapted to contact the actuating button 32 of a Microswitch 33 in a manner and for a purpose to be more fully described hereinafter.

From one contact N.O. of the microswitch 33 a conductor 34 extends to a junction 36 and thence to a trimming potentiometer 43. This trimming potentiometer is enclosed in the upper part of the chamber 12, above the shoulder 18 to which the open end of the bellows 17 is secured. A conductor 38 extends downwardly through the bottom 21 of the bellows 17, and thence downwardly through the bore 14 and into the sensing capsule 16. A second conductor 35 also extends from the other contact N.C. of the Microswitch 33 to the arm 42 of the potentiometer 43. The sensing capsule 16 contains a wire resistance element or heater 40, to one end of which the conductor 38 is connected: the other end of the heater 40 is connected by a conductor to one terminal of a low voltage battery 45, or any other desired source of D.C. voltage, which is located exteriorly of the casing 11. The heater 40 in the sensing capsule 16 is susceptible to the introduction of a variable low wattage heat leak, in a manner to be more fully described hereinafter. The sensor wire is preferably of a character which is substantially insensitive to temperature change such, for example, as "Karma" wire, a trademark which relates to a wire comprised of approximately 76Ni20Ch+Fe—Al, although other wires having similar characteristics may be employed.

The capsule 16 is adapted to be the only portion of the instrument which is in direct contact with the fluid to be sensed.

Conductors 46 and 47 extend from any suitable indicating or control instrument (not shown) through a bushing 48 in the wall of the casing 11. The conductor 46 is connected to the other terminal of the low voltage battery 45; the conductor 47 is connected to an arm 33a of the Microswitch 33. This arm 33a is operated by the actuating arm 31 through the button 32 of the Microswitch. When the arm 33a is closed on the contact N.C., the trimming potentiometer 43 is in circuit with the heater 40; when however this arm is closed on the contact N.O., the potentiometer 43 is shorted out of the circuit.

The instrument is carefully calibrated so that a definite volumetric ratio is established between the interior of the chamber 12 including its associated bore 14, and the interior of the capsule 16. This ratio has been found to one where the internal volume of the capsule is approximately one-tenth of that of the interior chamber 12. One ratio has been found to be .005 cubic inch to .05 cubic inch. While this ratio is not necessarily limited to 1 to 10, a high degree of sensitivity in the instrument has been found to be achieved by such a ratio for use with liquid hydrogen. Other ratios are suitable for other mediums.

The operating principle on which the liquid level sensor or detector operates is in accordance with the well known equation:

$$\frac{P_1 V_1^i}{T_1^i} + \frac{P_1 V_2^i}{T_2^i} = \frac{P_2 V_1^f}{T_1^f} + \frac{P_2 V_2^f}{T_2^f}$$

where $P_1$=initial system pressure in p.s.i.a.
$P_2$=final system pressure in p.s.i.a.
$V_1^i$=initial sensing volume in in.$^3$ or cm.$^3$
$V_1^f$=final sensing volume in in.$^3$ or cm.$^3$
$V_2^i$=initial auxiliary volume in in.$^3$ or cm.$^3$
$V_2^f$=final auxiliary volume in in.$^3$ or cm.$^3$
$T_1^i$=initial sensing volume temperature in ° R. or ° K.
$T_1^f$=final sensing volume temperature in ° R. or ° K.
$T_2^i$=initial auxiliary volume temperature in ° R. or ° K.
$T_2^f$=final auxiliary volume temperature in ° R. or ° K.

In the use and operation of the device, when the medium to be sensed is in its gaseous phase, a heat leak of .0125 watt is maintained through the sensing wire 40. This small heat leak will not be dissipated to any significant degree until the sensing volume is in intimate contact with the liquid phase. When the volume to be sensed liquefies, through either temperature or pressure change, or change in level, the corresponding change in the chamber 12 causes actuation of the bellows 17 and its associated operating rod 22 to move the switch arm 31 to actuate the Microswitch 33. At this time the trimming potentiometer 43 (see FIG. 3) is shorted out of the circuit of the switch by movement arm 33a onto the contact N.O., and the heat leak to the sensing wire 40 is increased to .2 watt, for example. This increased heat leak will be dissipated virtually in its entirety as long as the sensing volume is in intimate contact with the liquid phase of the medium, but when the state of the medium changes at the sensing volume, to vapor (due to change in liquid level, or other causes), then the heat leak of .2 watt becomes capable of heating the sensing volume, since it is no longer dissipated in the liquid phase, to the point where the internal increase in system pressure will actuate the Microswitch 33 to again close the arm 33a on the contact N.C. This will reduce the heat leak to .0125 watt, illustratively. At the same time the circuit will be closed across through the conductors 46 and 47 substantially instantaneously upon the change in phase of the measured medium to the desired indicating or control instrument (not shown).

FIGURE 4 discloses an adaptation of the instrument of the instant invention to a liquid level rake installation. The medium to be sensed is contained in a receptacle 50, which is suitably insulated, and provided with a flow pipe 51. A perforated still well 52 may be employed, which contains a rake 53. Suitably positioned at desired intervals along the rake 53 there are a plurality of detector instruments 10 of the type described in connection with FIGS. 1 to 3. The liquid phase of the medium L thus successively contacts sequentially the vertically disposed instruments, and the actuation of each successive instrument accurately measures the fluid level and simultaneously actuates its associated or related control or indicating mechanism.

From the foregoing it will now be seen that there is herein provided a liquid level indicator or sensor which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. An apparatus for sensing the change in phase in a fluid medium within a container and indicating the change on an indicating instrument comprised by a casing having a chamber therein and a bore from the chamber to the exterior of the casing, a capsule on the casing over the bore and adapted to extend into the container, a sensing coil within the capsule, an expansible element within the chamber exposed to the pressure within the latter, the bore and the capsule, a Microswitch operably connected to the expansible element, and circuit connections from the sensing coil through the Microswitch to the indicating instrument.

2. An apparatus for sensing the change in phase in a fluid medium within a container and indicating the change on an indicating instrument comprised by a casing having a chamber therein and a bore from the chamber to the exterior of the casing, a capsule on the casing over the bore adapted to extend into the container and having a chamber therein with one-tenth the volume of the chamber within the casing, a sensing coil within the capsule, an expansible element within the chamber of the casing exposed to the pressure within the latter, the bore and the chamber within the capsule, a Microswitch operably connected to the expansible element, and circuit connections from the sensing coil through the Microswitch to the indicating instrument.

3. An apparatus for sensing the change in phase in a fluid medium within a container and indicating the change on an indicating instrument comprised by a casing having a chamber therein and a bore from the chamber to the exterior of the casing, a capsule on the casing over the bore and adapted to extend into the container, a sensing coil within the capsule, an expansible element within the chamber exposed to the pressure within the latter, the bore and the capsule, a Microswitch connected to the expansible element, and circuit connections from the indicating instrument to the Microswitch, from the Microswitch to the sensing coil, from the sensing coil to the battery, and from the battery to the indicating instrument, whereby upon movement of the expansible element in one direction the Microswitch connects the sensing coil to the indicating instrument through the battery.

4. An apparatus for sensing the change in phase in a fluid medium within a container and indicating the change on an indicating instrument comprised by a casing having a chamber therein and a bore from the chamber to the exterior of the casing, a capsule on the casing over the bore and adapted to extend into the container, a sensing coil within the capsule, an expansible element within the chamber exposed to the pressure within the latter, the bore and the capsule, a Microswitch connected to the expansible element, a potentiometer, a circuit connection from the Microswitch to the sensing coil, and circuit connections from the indicating instrument to the Microswitch, from the Microswitch to the potentiometer, from the potentiometer to the sensing coil, from the sensing coil to the battery, and from the battery to the indicating instrument, whereby in one position of the expansible element the Microswitch connects the sensing coil to the indicating instrument through the battery, and in another position of the expansible element the Microswitch connects the sensing coil to the indicating instrument through the potentiometer and the battery.

References Cited in the file of this patent

UNITED STATES PATENTS

| 1,442,574 | Johnson | Jan. 16, 1923 |
| 1,856,586 | Persons | May 3, 1932 |
| 2,924,388 | Beck et al. | Feb. 9, 1960 |
| 2,978,691 | Beher | Apr. 4, 1961 |

FOREIGN PATENTS

| 678,618 | Germany | July 19, 1939 |
| 136,417 | Australia | Jan. 31, 1950 |
| 130,943 | Sweden | Feb. 27, 1951 |

OTHER REFERENCES

Woodcock: "A New Form of Gas Thermometer for Use at Very Low Temperatures," Canadian Journal of Research, vol. 16, 1938 (section A), pp. 133–137. (Copy in Div. 36; 73—368.2.)

Tunnicliff: "Gas Thermometer for Automatic Control of Low Temperatures," Analytical Chemistry, vol. 20, No. 10, October 1948. (Copy in Div. 36; 73—368.2.)